United States Patent
Lesh

(10) Patent No.: US 8,645,848 B2
(45) Date of Patent: Feb. 4, 2014

(54) SYSTEMS AND METHODS FOR DYNAMIC MENUS

(75) Inventor: Joseph C Lesh, Carrboro, NC (US)

(73) Assignee: Open Text S.A., Luxembourg (LU)

( * ) Notice: Subject to any disclaimer, the term of this patent is extended or adjusted under 35 U.S.C. 154(b) by 954 days.

(21) Appl. No.: 11/145,480

(22) Filed: Jun. 2, 2005

(65) Prior Publication Data

US 2005/0273762 A1    Dec. 8, 2005

Related U.S. Application Data

(60) Provisional application No. 60/576,841, filed on Jun. 2, 2004.

(51) Int. Cl.
*G06F 3/0482* (2013.01)

(52) U.S. Cl.
USPC .......................... 715/760; 717/115; 715/517

(58) Field of Classification Search
USPC ................. 715/762, 513, 763, 517, 817, 825; 717/115
See application file for complete search history.

(56) References Cited

U.S. PATENT DOCUMENTS

| | | | | |
|---|---|---|---|---|
| 6,002,402 A * | 12/1999 | Schacher | ...................... | 715/810 |
| 6,442,523 B1 * | 8/2002 | Siegel | ........................... | 704/270 |
| 6,564,217 B2 * | 5/2003 | Bunney et al. | .................. | 707/10 |
| 6,697,781 B1 * | 2/2004 | Sahlberg | ....................... | 704/260 |
| 6,769,010 B1 * | 7/2004 | Knapp et al. | .................. | 709/203 |
| 7,062,502 B1 * | 6/2006 | Kesler | ........................... | 707/102 |
| 7,136,875 B2 * | 11/2006 | Anderson et al. | .................... | 1/1 |
| 2001/0044809 A1 * | 11/2001 | Parasnis et al. | ............... | 707/513 |
| 2002/0120645 A1 * | 8/2002 | Adapathya et al. | ........ | 707/501.1 |
| 2002/0174147 A1 * | 11/2002 | Wang et al. | ................... | 707/513 |
| 2002/0178007 A1 * | 11/2002 | Slotznick et al. | .......... | 704/270.1 |
| 2002/0188633 A1 * | 12/2002 | Davis et al. | .................... | 707/513 |
| 2003/0023445 A1 * | 1/2003 | Trifon | ........................ | 704/270.1 |
| 2003/0101235 A1 * | 5/2003 | Zhang | ........................... | 709/218 |
| 2003/0204815 A1 * | 10/2003 | Edwards et al. | ............... | 715/513 |
| 2004/0021684 A1 * | 2/2004 | Millner | ........................ | 345/719 |
| 2004/0031058 A1 * | 2/2004 | Reisman | ....................... | 725/112 |
| 2004/0068527 A1 * | 4/2004 | Smith, III | ..................... | 707/204 |
| 2004/0123244 A1 * | 6/2004 | Campbell et al. | ............. | 715/517 |
| 2005/0034063 A1 * | 2/2005 | Baker et al. | .................... | 715/513 |
| 2005/0039141 A1 | 2/2005 | Burke | ............................. | 707/10 |
| 2005/0071165 A1 * | 3/2005 | Hofstader et al. | ......... | 704/270.1 |

(Continued)

OTHER PUBLICATIONS

Accessible Dropdown menu, Mar. 7, 2004, http://home.tele2.fr/ikari/menu/dropdown-menu-en.html, 4 pages.

(Continued)

*Primary Examiner* — Boris Pesin
*Assistant Examiner* — Henry Vuu
(74) *Attorney, Agent, or Firm* — Winston & Strawn LLP

(57) ABSTRACT

Systems and method for dynamically loaded menus and objects are provided that can provide cross-platform capability and accessibility features. Objects in a page that are dynamic or are not human-readable (e.g., executable or images) can be identified and enhanced for compatibility with screen readers. HTML corresponding to the object can be generated and loaded in storage for use within the web page. The loaded HTML can be copied into the HTML of the web page. A blank placeholder may be displayed in the area in which the corresponding HTML is to be displayed and the corresponding HTML is displayed over the placeholder to provide a replacement object such as to display a list of URL menu items.

31 Claims, 4 Drawing Sheets

(56) References Cited

U.S. PATENT DOCUMENTS

| | | | |
|---|---|---|---|
| 2005/0160141 A1* | 7/2005 | Galley et al. | 709/204 |
| 2005/0216834 A1* | 9/2005 | Gu | 715/522 |
| 2005/0246653 A1* | 11/2005 | Gibson et al. | 715/773 |
| 2007/0198945 A1* | 8/2007 | Sun et al. | 715/779 |

OTHER PUBLICATIONS

Aplus Moments, DHTML menu using semantic markup, Sep. 3, 2003, http://www.aplus.co.yu/adxmenu/dhtml-menu-using-semantic-markup/, 4 pages.

Juicy Studio: Accessible Dynamic Menu, Jan. 21, 2004, http://www.juicystudio.com/accessible-dynamic-menus/, 3 pages.

Scripting Accessibility Issues: Menus, Mar. 1, 2002, http://web.archive.org/web/20020301064915/cita.rehab.uiuc.edu/scripting/script-menus.html, 1 page.

An Accessible DHTML Menu, Oct. 2003 (with modification made in Feb. 2004), http://web.archive.org/web/20031003173115/accessatc-net.us/articles/menu.html, 11 pages.

How to cover an IE windowed control (Select Box, ActiveX Object, etc.) with a DHTML layer, Jul. 21, 2003, http://dotnetjunkies.com/WebLog/jking/archive/2003/07/21/488.aspx, 4 pages.

Sample for using a DIV IFRAME shim to cover over Select Boxes and other windowed controls in IE, Oct. 30, 2003, http://dotnetjunkies.com/WebLog/jking/archive/2003/10/30/2975.aspx, 13 pages.

Accessible Website Menu: Ultimate Drop Down Menu by Brothercake, Feb. 2, 2004, http://web.archive.org/web/20040202122551/af.brothercake.com/dropdown/, 3 pages.

DOM1 visibility menus, as of May 11, 2005, http://codestyle.org/javascript/dom/css/visibility-HorizontalMenus.shtml, 15 pages.

HierMenusCentral: The easy way to add drop down menus to a website, Apr. 8, 2004 and various other dates, http://web.archive.org/web/20040605093954/www.hiermenuscentral.com, 57 pages.

Garrett, Jesse James, "Ajax: A New Approach to Web Applications", Feb. 18, 2005, http://www.adaptivepath.com/ideas/essays/archives/00385.php, pp. 1-9.

Garrett, Jesse James, Wikipedia biography, Apr. 22, 2009, http://en.wikipedia.org/wiki/Jesse_James_Garrett, pp. 1-2.

Supplementary European Search Report, EP05772174.8 dated Jan. 29, 2010.

Communication, Examining Report EP05772174.8 dated Apr. 9, 2010.

Brothercake: XP-002560773,"Ultimate Dropdown Menu 4.1, by Brothercake" May 3, 2004, pp. 1-86, , Retrieved from the Internet: pp. 1-86, URL:http://web.archive.org/web/20040321234941/www.udm4.com/> [retrieved on Dec. 11, 2009].

Gunderson J: XP-002560774,"W3C user agent accessibility guidelines 1.0 for graphical Web browsers" Universal Access in the Information Society Springer-Verlag Germany, vol. 3, No. 1, Feb. 26, 2004, pp. 38-47.

Leporini B et al: XP-002560775, "Increasing usability when interacting through screen readers" Universal Access in the Information Society Springer-Verlag Germany, vol. 3, No. 1, Feb. 24, 2004, pp. 57-70.

HierMenusCentral.com: XP008112190 ,"508 Compliance Issues: Keyboards/Screen Readers/JavaScript Can't Access Menus" Internet Citation Apr. 21, 2004, pp. 1-3, Retrieved from the Internet: URL:http://www.hiermenuscentral.com/issues /23. html>.

HierMenusCentral.com: XP-002560776, "Menus Are Inconsistent When Appearing Over IFrames", May 21, 2004, pp. 1-1, Retrieved from the Internet: URL:http://www.hiermenuscentral.com/issues /24.html>[retrieved on Dec. 11, 2009].

W3C: XP-002459273, "HTML Techniques for Web Content Accessibility Guidelines 1.0" Internet Citation Nov. 6, 2000, pp. 1-46, Retrieved from the Internet: URL:http://www.w3.org/TR/WCAG10-HTML-TECHS/> pp. 1-56.

Rogoff R Ed ,—XP-010568099, "Making electronic information accessible to everyone", Institute of Electrical and Electronics Engineers: International Professional Communication Conference. Proceedings. IPCC 2001. Santa Fe, NM, Oct. 24-27, 2001; [International Professional Communication Conference], New York, NY IEEE, US, Oct. 24, 2001, pp. 231-236.

International Preliminary Report on Patentability dated Oct. 26, 2006 for application No. PCT/US05/19433.

Written Opinion of the International Searching Authority mailed Apr. 12, 2006 for application No. PCT/US05/19433.

Response to Written Opinion Filed Jun. 9, 2006 for application No. PCT/US05/19433.

International Search Report for Application No. PCT/US2005/19433.

Brothercake, "Ultimate Dropdown Menu v3.8 by Brothercake", Feb. 7, 2003, http://web.archive.org/web/20030207033443/http://www.brothercake.com/dropdown/.

HierMenus 5.0.1, "HierMenus 5.0.1: Release Notes", May 29, 2003, Jupitermedia Corporation, http://web.archive.org/web/20030622080915/www.webreference.com/dhtml/hiermenus/inprogress/3/.

HierMenus 5.0, "HierMenus 5.0: Release Notes", Apr. 22, 2003, Jupitermedia Corporation, http://web.archive.org/web/20030602184240/www.webreference.com/dhtml/hiermenus/inprogress/2/.

HierMenusCentral.com, "508 Compliance Issues: Keyboards/Screen Readers/JavaScript Disabled Browsers Can't Access Menus", Apr. 21, 2004, Jupitermedia Corporation, http://www.hiermenuscentral.com/issues/23.html.

WebMenu v2.0, "Overview", Feb. 4, 2003, Coalesys, Inc., http://web.archive.org/web/20030204133802/www.coalesys.com/products/webmenuaspdotnet/features.

Brothercake, "Ultimate Dropdown Menu v4.4—List-based Semantic DHTML Menu", by Brothercake, May 9, 2006, http://web.archive.org/web/20050203005632/www.udm4.com/.

Brothercake, "Ultimate Dropdown Menu v3.3—Using a Speech Agent", by Brothercake, Feb. 22, 2006, http://web.archive.org/web/20030203101913/www.brothercake.com/dropdown/speech_agent.html.

Brothercake, "Ultimate Dropdown Menu v3.7—Virtual Alignment", by Brothercake, Feb. 22, 2006, http://web.archive.org/web/20021216204727/www.brothercake.com/dropdown/triggers.html.

Brothercake, "Ultimate Dropdown Menu v3.8—Advanced Customisation", by Brothercake, Feb. 23, 2006, http://web.archive.org/web/20030203100201/http://www.brothercake.com/dropdown/advanced.html.

* cited by examiner

SYSTEMS AND METHODS FOR DYNAMIC MENUS

Cross-Reference to Related Application

This application claims the benefit of U.S. application No. 60/576,841 filed Jun. 2, 2004, the entire content of which is incorporated herein.

FIELD OF THE INVENTION

The present inventions relates to systems and methods for dynamically generating objects.

BACKGROUND

Applications written using HTML to display their user interface have had to contend with the limits imposed by a display technology designed for periodical-style layout and simple data entry forms. Chief among the problems has been the lack of a robust menu system mirroring menu systems commonly found in desktop applications. Java Applets and JavaScript have both been used to solve this problem, however they are known to have drawbacks, for example, because they are not, as yet, compatible with screen reading software and, for example, because they are not typically known to be capable of allowing users to navigate with only the keyboard. These drawbacks have placed web-based applications that use robust menu systems in conflict with Section 508 of the Rehabilitation Act which requires that Federal agencies' electronic and information technology be accessible to people with disabilities. In certain cases, it may also conflict with portions of the Americans with Disabilities Act.

One of the common uses for menus in an application (e.g., an application such as Livelink by Open Text, Corp.) is to present a list of actions available to perform on or in connection with a specific object. There are often many objects in a page that may each have its own menu containing the list of actions the user is able to perform on or in connection with that object. In a system with individually permissioned objects, to generate the list of usable actions, each possible action is checked to see if the user has the appropriate permissions to operate the action on that object. In such systems, for a page with many objects, this permission checking can take a significant amount of server processing time. Given that the user typically only views the menus of a few objects before choosing an action from a menu, the permission calculations for unviewed menus waste computing resources. Therefore, it is can be desirable to defer the permission checking until the user requests to see an object's list of actions. One known way to implement this permission checking by sending the user to a new page for each object picked. However, concern for usability precludes directing the user to a new page to see the list of available actions for a specific object. In systems that do not require permission checking for objects to be performed when the object are presented the user, other limitations such as the need for Section 508 compliance may also exist.

Thus, it is desired to provide improved menu systems to address these drawbacks and other objects of the present invention.

SUMMARY OF THE INVENTION

In accordance with the principles of the present invention, systems and methods for dynamically generating accessibility enhanced menus can be provided. In one embodiment of the present invention, the systems and method are configured to be implemented across different platforms (e.g., different browsers or different operating systems). For example, methods and systems for dynamically generating accessibility enhanced menus can be provided that can include displaying a web page (e.g., using conventional technology) and providing a user with an opportunity to request a menu identified in the web page. The web page object can for example identify or be linked to an executable application or module that is configured to dynamically generate a menu, which is not compatible with screen readers. The incompatibility can be because the generated menu is an executable or dynamic object. The systems and methods of the present invention can include generating a request for the menu (e.g., requesting information on the content of the menu, which may be include context-sensitive menu items) and generating HTML code defining the requested menu (e.g., HTML code that identifies each menu item and supporting links, which may if desired be context sensitive). Such systems and methods can further include copying the generated HTML code into the web page (e.g., based on the location of the menu in the original page) and displaying the HTML code to display the requested menu. For example, the menu can be displayed by refreshing the page to display the menu based on the HTML code (e.g., the HTML code is copied into the source for the web page and displayed when the web page is refreshed, in other words, rendered, reloaded, or otherwise updated automatically). If desired, the data transmitted in response to the request (e.g., the HTML code) can be in a form that is readable by accessibility applications for the visually impaired. The process may include positioning the HTML code to display the menu.

In another aspect, methods and systems of the present invention can for example include displaying a context sensitive menu control (e.g., a link for activating the display of related menu items based on the current context such as the current user, application, access rights, document, menu item availability, etc.) in a web page (e.g., a web page that is compatible with different browsers such as Internet Explorer, Netscape Navigator, Mozilla, etc.). A user can be provided with an opportunity to select the menu control (e.g., by tabbing to the menu control) and in response to the user selecting the menu control, menu items for the menu control are generated that are readable (e.g., includes text context) by accessibility applications (e.g., JAWS) for visually impaired users. The generated menu items can subsequently be displayed in a floating menu in the web page in proximate location with the menu control. Thus providing a context sensitive dynamically generated menu that is compatible with accessibility applications and is displayed in a floating menu in appropriate context in the web page.

In another aspect of the present invention, methods and systems for replacing web page objects with replacement objects that are compatible with screen readers can be provided. For example, a web page object (e.g., an executable menu that generates menu items when selected such as a JavaScript dynamic menu, or an object such as an image) can be identified in a web page for replacement. A request to have one more replacement objects generated can be sent (e.g., sent to a server, or some to other resource such as a local application) when a user selects the web page object (e.g., to generate menu items for the menu in a different format such as HTML). Such method and systems may further include loading the replacement objects in a separate location hidden from the user (e.g. load in a separate page or other storage). A blank frame (e.g., an IFRAME) can be displayed in the web page in close proximity to the web page object. The replacement objects can be copied to the web page. In addition, the replacement objects can be displayed over the blank frame.

In another aspect of the present invention, methods and systems for complying with enhanced accessibility requirements can be provided. For example, a user may be provided with an opportunity to request a menu in a networked enterprise application. The menu can be generated and loaded as a complete HTML page into a hidden web page such as an IFRAME until it is completely received from a server (or other computer) on which the networked enterprise application has been implemented. This can involve generating a request for the HTML page for the menu using JavaScript and sending the request to the server (or other computer). HTML source code for the menu can be copied from the IFRAME into the original HTML page from which the user was provided with the opportunity to request the menu. In addition, menu size and position can be adjusted and a blank IFRAME can be positioned underneath the menu.

In another aspect, systems and methods of the present invention can for example include the user requesting a menu, JavaScript sending a request to the server for the menu, the menu being generated as a complete HTML page into a hidden IFRAME until it is completely received from the server, the HTML for the menu being copied from the IFRAME into to the original HTML page, the size and positioning of the menu being tweaked and a blank IFRAME is positioned underneath the menu, and the menu is revealed to the user.

Dynamic accessibility enhanced objects or menus of the present invention can be implemented in a number of ways. For example, Cascading Style Sheets (CSS), JavaScript and HTML techniques can be combined to provide such objects or menus.

For example, HTML can be used to layout the menu and sub-menus. Using HTML to display the menu ensures that the panoply of HTML consumers will be able to interpret the menu. These HTML consumers include web browsers like Netscape, Mozilla, and Internet Explorer in addition to commonly used accessibility applications like JAWS. Accessibility applications read the text and links on a web page aloud and are commonly called screen readers. However, they are not able to read aloud text that is included in within executables, such as a Java applet, or in an image, such as a GIF or JPEG. The use of HTML, which the screen reader can turn into spoken words, can avoid obstacles to accessibility posed by executables or images that are part of web pages to which such techniques are applied.

An application program interface such as JavaScript's Document Object Model (DOM) API can for example be used to transfer dynamically loaded content into an already loaded and rendered page. In this example, using the standard DOM model developed by the World Wide Web Consortium can provide that this JavaScript technique will be supported across browser implementations and versions. However, other techniques may also be used if desired.

In order to position HTML so that it appears over the HTML page, an IFRAME or other tool can be used. It is commonly understood that HTML positioned above a standard SELECT drop-down menu (like that used to choose your state on a web form) or a Java applet will seem to disappear. This is known to be confirmed in a Microsoft technical note. Since the use of dynamic menus or objects could occur on pages that will contain any combination of HTML and Java applets, the disappearance of the HTML should likely be addressed. In one embodiment an IFRAME can be used and positioned underneath the HTML menu. As such, the menu would appear to float above all HTML elements, including SELECT menus and Java applets.

For example, in some embodiments, the present invention can include methods for complying with enhanced accessibility requirements, such as by providing a user with an opportunity to request a menu in a networked enterprise application, generating a request for the menu using JavaScript, sending the request to a server on which the networked enterprise application has been implemented, generating and loading the menu as a complete HTML page into a hidden IFRAME until it is completely received from the server, copying HTML for the menu from the IFRAME into an original HTML page from which the user was provided with the opportunity to request the menu; and adjusting the menu size and position and positioning a blank IFRAME underneath the menu.

Systems for implementing embodiments of the present invention may include client-server arrangements, enterprise applications, Internet applications, or other hardware, software, or combination thereof for providing the systems and method of the present invention. For example, dynamic menus may be generated from a response to a request sent to a server or from information obtained from other resources such as a local application. In another example, such dynamic menu techniques may be particularly suitable for enterprise solutions and in some cases may be applicable to applications having Internet accessibility. In another aspect, the present invention can be applicable to circumstances involving objects or menus displayed by conventional browsers (e.g., with the use of a plug-in module, through the detection of a browser mode at a remote location such as server that will implement relevant processes, etc.). Some embodiments of the present invention may be compatible across different platforms and applications while others may be configured for particular applications. Such techniques can provide among its advantages applications that can be compliant with Section 508 of U.S. laws regarding enhanced accessibility of software applications for the visually impaired (e.g., in combination with a screen reader).

BRIEF DESCRIPTION OF THE DRAWINGS

Further features of the invention, its nature, and various advantages will be more apparent from the following detailed description, taken in conjunction with the accompanying drawings in which like reference characters refer to like parts throughout, and in which.

DETAILED DESCRIPTION OF PREFERRED EMBODIMENTS

Figure 3:
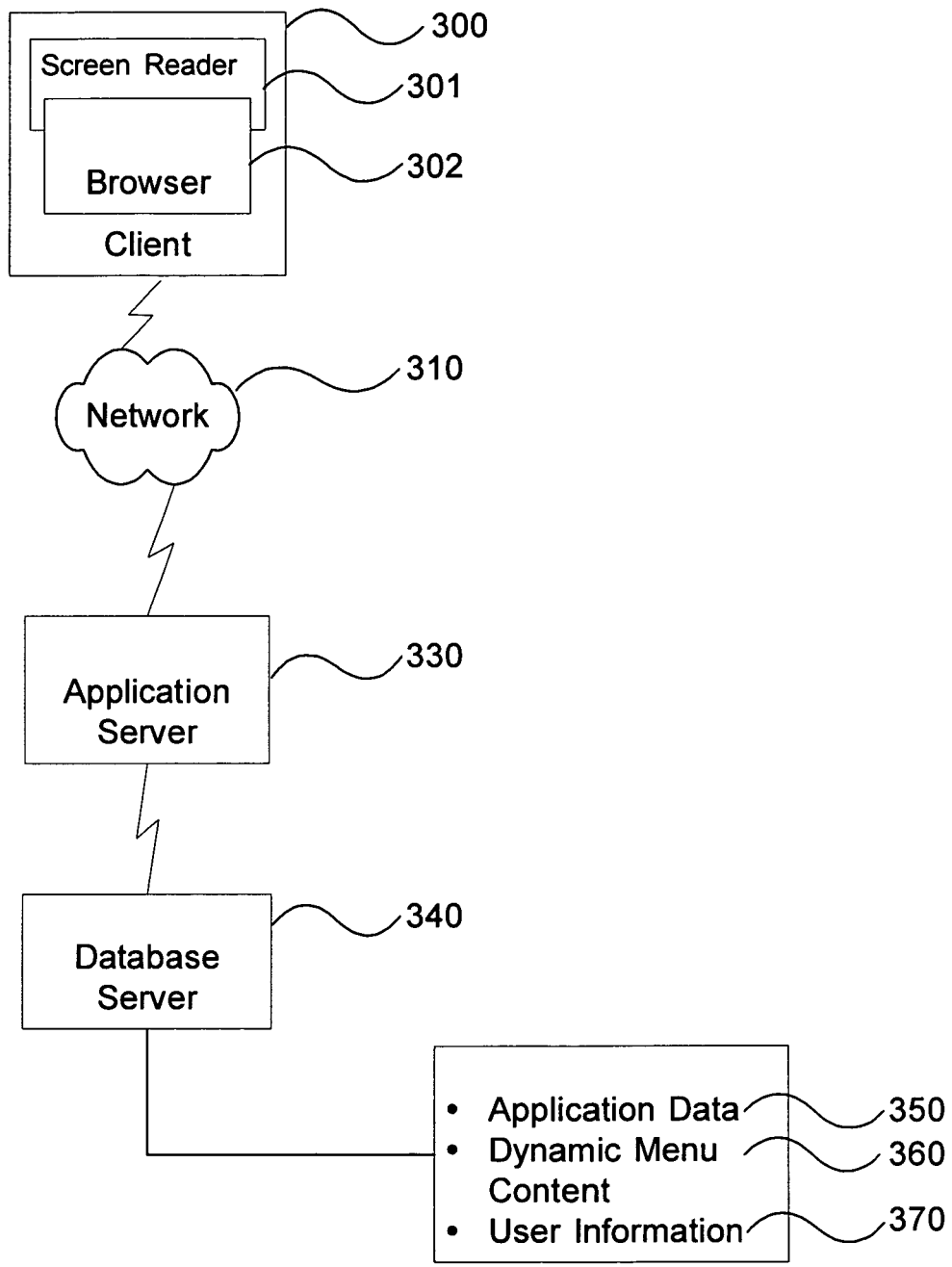
FIG. 3 schematically illustrates an exemplary system for supporting a menu in accordance with one embodiment of the present invention.

FIG. 3 schematically illustrates an exemplary system for supporting a dynamic menu. As shown in FIG. 3, the exemplary system includes one or more client digital data processing devices 300 ("clients"), one or more application server digital data processing devices 330 ("servers"), and one or more database server digital data processing devices 340 ("databases"). A web browser application 302 ("browser") residing on client 300 communicates with application server 330 using one or more data communications networks 310 ("networks"). The application server 330 and database server 340 operate together to process application data 350 that is sent to browser 302 in the form of a web page containing an element that allows the person operating client 300 to activate and display dynamic menu content 360 that is tailored based on user information 370 belonging to that person. Some embodiments may also include a screen reader application 301 (such as JAWS® from Freedom Scientific®) that interprets the contents of web pages displayed in browser 302 for the benefit of a visually impaired person using client 300.

Figure 4:
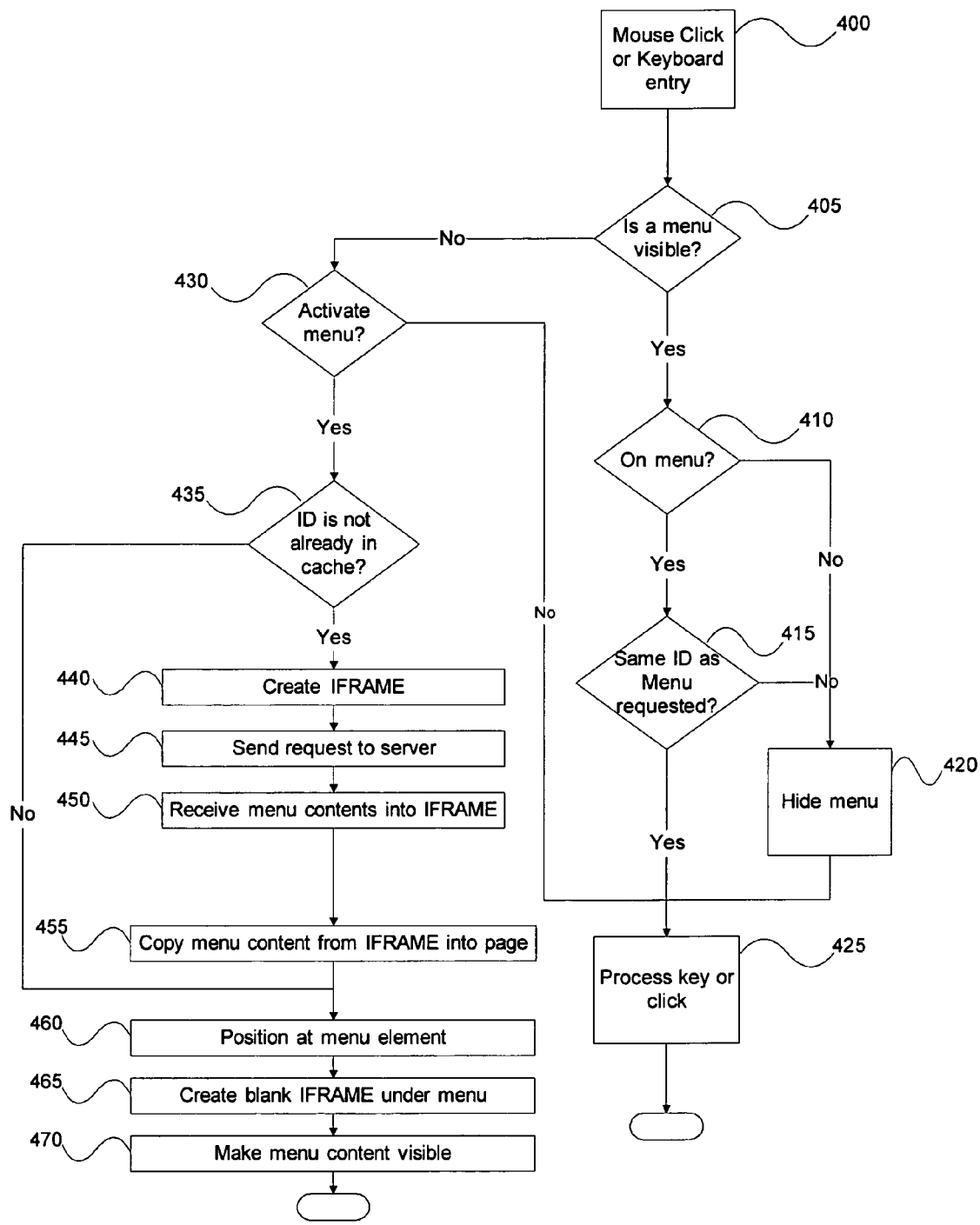
FIG. 4 is a flowchart of exemplary processing for displaying a menu in accordance with one embodiment of the present invention.

Systems and method of embodiments of the present invention can be implemented in different ways. For example, a user can browse to a page that has a button or other mechanism (generically called a menu control) to open the menu. Each menu can be coded with a unique identifier assigned to the ID attribute on its HTML tag. This menu control can for example be an image. This mechanism can be surrounded by an anchor tag (e.g., the kind of tag that creates very common hyperlinks in a webpage). FIG. 4 is a flowchart of exemplary processing for implementing the present invention. With reference now to FIG. 4, the anchor tag can specify that when a user clicks (400) on the menu control a specific JavaScript function should be executed. The call to the JavaScript function can pass along a unique identifier for the object whose menu control was activated (430).

Figure 1:
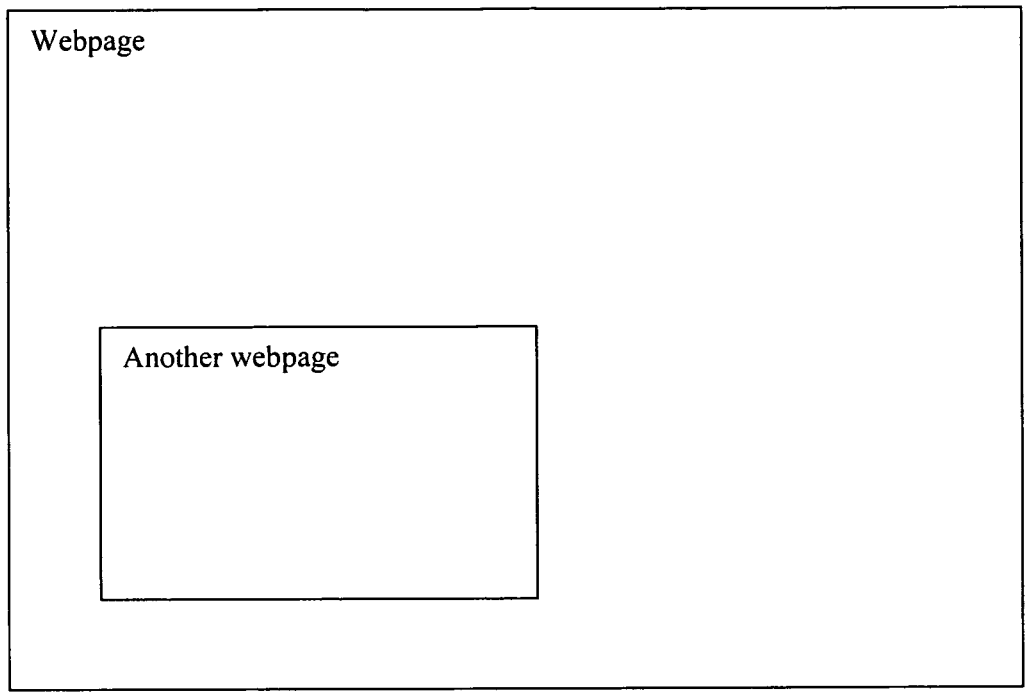
FIG. 1 is a diagram of a web page within a web page for displaying a menu in accordance with one embodiment of the present invention.

This JavaScript function can record some positioning information, and, if the object's menu has not already been loaded for this instance of the page (435), it instructs an IFRAME (440) to load a new webpage (URL) (445). An IFRAME is a piece of HTML that can contain another complete HTML page, just as though a separate window has been opened in a browser, but within the original HTML page (see for example FIG. 1). However, this IFRAME 102 is set to be completely invisible so that the current user does not see this temporary holding place for the menu. The URL that the IFRAME loads can be coded so that it returns the menu for the correct object (450).

The URL returns an HTML document that contains the menu items and sub-menus. The last item on the HTML page returned by the URL can be a JavaScript script. This script can be executed as it is loaded by the browser. This script calls a JavaScript function defined by the parent window using a predetermined name. The function may for example use the identification of the object for which the menu was generated and the DOM HTMLElement that is the root node (container) of the menu as parameters. The function then can use a property of the root menu node called inner HTML to insert the HTML for the menu into the parent window (455). This HTML code can be inserted into the original page just after the HTML code for the menu control whose unique identification matches that of the requested menu (460).

Copying the menu HTML into the HTML of the rendered page allows the menu to be cached until the page is refreshed. The JavaScript can simply use the identification of the object to check for the presence of the menu element for that identification (435). This way if a user views a menu for an object and thereafter views a second object and returns to view the menu for the first object, a request will not be issued to the server to retrieve the list of actions, which may conserve computing resources.

If desired the URL can return the data for the menu items and sub items in another format, for example SGML or XML, that can easily be converted to HTML prior to being inserted into the original web page.

Figure 2:
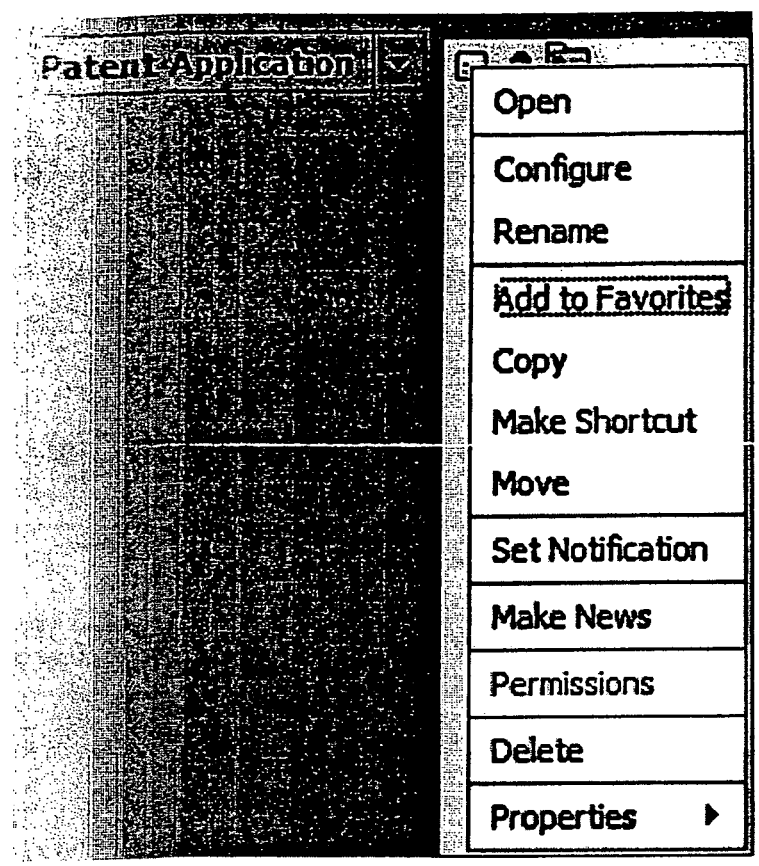
FIG. 2 is an illustrative example of a menu generated in accordance with one embodiment of the present invention.

Once the HTML for the menu is inserted into the HTML for the original page, JavaScript (e.g., of the original page) can use cascading style sheet (CSS) technology to show, hide, and position the menu. First, the JavaScript can position the menu and insert a blank IFRAME underneath the menu (465), which causes the menu to float over all items on the webpage, including Java applets and drop-down menus (e.g., see FIG. 2). Finally, the CSS style called 'visibility,' set to 'hidden' when the menu is generated, is set to 'visible' on both the menu and IFRAME underbelly (470).

The contents of the menu can be composed entirely of standard DIV, IMG and anchor tags. This can allow screen readers to accurately recognize and read the links aloud. It also allows navigation through simple presses of the tab key to move between links and presses of the Enter key to open the menu and sub-menus or to execute a menu item. For the average user, CSS styles can be used to replicate the look of a more traditional menu system. Browsers also recognize hyperlinks as elements that can be tabbed to, making the menu system filly keyboard accessible, even to those users who do not have a screen reader.

CSS styles can be used to show and hide the menus. The 'visibility' style is typically supported by both screen readers and browsers, which provides the ability to hide a menu while retaining its HTML within a page (405, 410, 415, 420, and 425). Menus with the 'visibility' style set to 'hidden' are not read by the screen reader nor are they reachable using the keyboard. Activation of the menu control causes this style to be set to visible, which can thus, allow the screen reader and the browser to read and access the menu.

Such solutions can provide menu systems that resemble those found in desktop applications, which can load its content dynamically, is usable by screen readers, and adheres to accessibility guidelines such as the guidelines in Section 508.

The systems and methods of the present invention can be useful for example in any web-based application that wishes to defer the generation of a menu until the menu is requested by the user and to satisfy the accessibility requirements (e.g., Section 508).

The system and method described herein provide examples of ways to implement such systems and method, which may be particularly suited for an enterprise applications such as Livelink by Open Text, Corp. (e.g. embedded in the core of the application) as for example described in the attached appendix entitled Technical Specification Document for: Livelink Menu Enhancements, but could also implemented in other ways (e.g., a 'dropin' solution) or in other applications.

Although preferred embodiments of the invention have been illustrated in the accompanying drawings and described in the foregoing Detailed Description of the Preferred Embodiments, it will be understood that the invention is not limited to the embodiments disclosed but is capable of numerous rearrangements and modifications of parts and elements without departing from the spirit of the invention. It will be understood that the details of every design and embodiment may be slightly different or modified by one of ordinary skill in the art without departing from the systems, apparatus, and methods taught by the present invention.

What is claimed is:

1. A method for dynamically generating menus, comprising:
   displaying a web page by a browser;
   providing, by the browser, a user with an opportunity to request a menu identified by a menu placeholder in the web page;
   generating a request for a menu content of the menu;
   receiving, in response to the request, the menu content over a network after displaying the web page;
   generating, by the browser, an HTML code that identifies at least one menu item in a first portion of the received menu content based on the browser executing a second portion of the menu content, wherein the second portion of the menu content comprises an executable script by:
   (a) identifying, by the executable script executed by the browser, whether a web page object in the web page is unreadable by an accessibility application for visually impaired users, wherein the accessibility application comprises a screen reader configured to turn HTML into spoken words, wherein the web object that is identified as unreadable is further identified to be replaced by a replacement object that is readable by the accessibility application; and
   (b) executing, by the browser, the executable script from the second portion of the menu content;
   (c) based on executing of the script and an identification of the web object that is to be replaced, executing by the browser a function that was defined by a parent window of the web page, wherein parameters to the function includes the identification of the web object that is to be replaced; and
   (d) based on executing the function, generating, by the browser, the HTML code in a form of the replacement object that is readable by the accessibility application based on the web page object that is identified as unreadable;
   replacing, by the browser, the web page object with the replacement object by copying the generated HTML code into the displayed web page at a location of the placeholder to enable the accessibility application to read the replacement object as a replacement for the web page object that is identified as unreadable; and
   displaying an HTML component based on the newly inserted HTML code to display the menu.

2. The method of claim 1 wherein identifying, by the browser, whether the web page object in the web page is unreadable by the accessibility application for visually impaired users, further comprises identifying, within the web page, an executable object or an image as incompatible with the accessibility application.

3. The method of claim 1 wherein generating HTML code comprises generating the HTML code in a form that is readable aloud by the accessibility applications for visually impaired users.

4. The method of claim 1 wherein the displaying comprises:
   changing, by the browser, a visibility style of the generated HTML code to dynamically allow both the accessibility application and the browser to access the generated HTML code; and
   displaying menu items in a floating menu in the web page in proximate location with the requested menu.

5. The method of claim 1 wherein generating HTML code is performed using a separate location hidden from the user.

6. The method of claim 1 which further comprises displaying a frame in the web page in close proximity to the menu placeholder.

7. The method of claim 6 which further comprises displaying the newly inserted HTML component over the frame.

8. The method of claim 1 which further comprises:
   storing each menu with an identification; and
   checking the identification of the stored menus when a menu is requested.

9. A system for dynamically generating menus, comprising:
   a client server arrangement that is configured to
      display a web page on a client by a browser;
      provide a user with an opportunity to request a menu identified by a menu placeholder in the web page;
      generate a request for a menu content of the menu;
      receive, in response to the request, an executable script and the menu content from a server after displaying the web page;
      generate, by the browser, an HTML code that identifies at least one menu item in a first portion of the received menu content based on the browser executing a second portion of the menu content, wherein the second portion of the menu content comprises an executable script by:
         (a) identifying, by the executable script executed by the browser, whether a web pace object in the web pace is unreadable by an accessibility application for visually impaired users, wherein the accessibility application comprises a screen reader configured to turn HTML into spoken words, wherein the web object that is identified as unreadable is further identified to be replaced by a replacement object that is readable by the accessibility application;
         (b) executing, by the browser, a script from the second portion of the menu content;
         (c) based on executing of the script and an identification of the web object that is to be replaced, executing by the browser a function that was defined by a parent window of the web page, wherein parameters to the function includes the identification of the web object that is to be replaced; and
         (d) based on executing the function, generating, by the browser, the HTML code in a form of the replacement object that is readable by the accessibility application based on the web page object that is identified as unreadable;
      replace, by the browser, the web page object with the replacement object by copying the generated HTML code into the displayed web page at a location of the placeholder to enable the accessibility application to read the replacement object as a replacement for the web page object that is identified as unreadable; and
      display an HTML component at the placeholder based on the HTML code to display the menu.

10. The system of claim 9 wherein the arrangement is configured to store each menu with an identification, and to check the identification of the stored menus when a menu is requested.

11. The system of claim 9 wherein the menu is a context sensitive menu.

12. The system of claim 9 in which the client server arrangement is configured to generate HTML code by using a separate location hidden from the user.

13. The system of claim 9 in which the client server arrangement is configured to display a blank frame in the web page in close proximity to the menu.

14. Computer readable medium on which software is recorded, wherein the software is configured to implement a method for dynamically generating menus, which causes a computer to perform actions which comprises:
  displaying a web page by a browser, wherein the displayed web page includes a function loaded in the parent window of the web page; and after displaying the web page and loading the function in the parent window, performing the following steps by the browser:
  providing a user with an opportunity to request a menu identified by a menu placeholder that is to be replaced by an HTML code in the web page;
  generating a request for a menu content of the menu;
  receiving, in response to the request, the menu content over a network after displaying the web page;
  generating, by the browser, the HTML code that identifies at least one menu item in a first portion of the received menu content based on the browser executing a second portion of the menu content, wherein the second portion of the menu content comprises an executable script by:
    (a) identifying, by the executable script executed by the browser, whether a web object in the web page is unreadable by an accessibility application for visually impaired users, wherein the accessibility application comprises a screen reader configured to turn HTML into spoken words, wherein the web object that is identified as unreadable is further identified to be replaced by a replacement object that is readable by the accessibility application;
    (b) executing, by the browser, the executable script from the second portion of the menu content;
    (c) based on executing of the executable script and an identification of the web object that is to be replaced, executing by the browser the function that was loaded with the web page in the parent window of the web page, wherein parameters to the function includes the identification of the web object that is to be replaced; and
    (d) based on executing the function, generating by the browser the HTML code in the form of the replacement object that is readable by the accessibility application based on the web page object that is identified as unreadable;
  replacing, by the browser, the web page object with the replacement object by copying the generated HTML code into the displayed web page at a location of the placeholder to enable the accessibility application to read the replacement object as a replacement for the web page object that is identified as unreadable; and
  displaying an HTML component at the placeholder based on the HTML code to display the menu.

15. The computer readable medium of claim 14 wherein the method comprises:
  storing each menu with an identification; and
  checking the identification of the stored menus when a menu is requested.

16. The computer readable medium of claim 15 wherein the menu is a context sensitive menu.

17. The computer readable medium of claim 15 wherein generating HTML code is performed using a separate location hidden from the user.

18. The computer readable medium of claim 15 wherein the method comprises displaying a blank frame in the web page in close proximity to the menu.

19. A method for providing a content configured to be interpreted by an accessibility application, comprising:
  receiving, in a first communication, a web page displayed by a browser comprising an HTML placeholder for an object that is not compatible with the accessibility application, wherein the accessibility application comprises a screen reader configured to turn HTML into spoken words;
  receiving, in a second communication, the content comprising a first portion and a second portion, wherein the first portion is representative of the object and the second portion comprises an executable script;
  identifying whether the object is unreadable by the accessibility application, wherein the object that is identified as unreadable is further identified to be replaced by a replacement object that is readable by the accessibility application;
  executing the second portion of the content;
  based on the executing of the second portion and an identification of the web object that is to be replaced, executing by the browser a function that was defined by a parent window of the web page, wherein parameters to the function includes the identification of the web object that is to be replaced;
  based on the executing of the function, generating, by the browser, an HTML code in the form of the replacement object that is readable by the accessibility application based on the web page object that is identified as unreadable;
  replacing, by the browser, the web page object with the replacement object by copying the generated HTML code into the webpage at a location for the placeholder to enable the accessibility application to read the replacement object as a replacement for the web page object that is identified as unreadable.

20. The method of claim 19, further comprising:
  displaying a menu for the object in close proximity to the placeholder for the object based on the inserting of the generated HTML code.

21. The method of claim 19, wherein the content comprises an item of a menu.

22. A server for providing content navigable by an accessibility limited user over a network, comprising:
  a processor configured to perform actions comprising:
    providing, over the network, a web page comprising an HTML placeholder for an object;
    receiving, over the network, a request for information about the object from a browser displaying the web page;
    identifying by executable script executed by the browser whether a web page object in the web page is unreadable by an accessibility application for visually impaired users, wherein the accessibility application comprises a screen reader configured to turn HTML into spoken words, wherein the web object that is identified as unreadable is further identified to be replaced by a replacement object that is readable by the accessibility application; and
    providing a code representative of the information in a first portion, wherein a second portion of the code is further configured to cause the browser to generate the executable script, to generate a HTML code as the replacement object and to dynamically modify the placeholder to display the replacement;
  wherein, based on executing of the script and an identification of the web object that is to be replaced, the browser:

executes a function that was defined by a parent window of the web page, wherein parameters to the function includes the identification of the web object that is to be replaced; and generates the HTML code in a form of the replacement object that is readable by the accessibility application based on the web page object that is identified as unreadable;

replaces the web page object with the replacement object by copying the generated HTML code into the displayed web page at a location of the placeholder to enable the accessibility application to read the replacement object as a replacement for the web page object that is identified as unreadable; and displays an HTML component based on the newly inserted HTML code to display the menu.

23. The server of claim 22, wherein the replacement object is navigable by the accessibility limited user.

24. The server of claim 22, wherein the object is unnavigable by the accessibility limited user.

25. The server of claim 22, wherein the HTML placeholder and the HTML version of the code are configured to be navigable by the accessibility limited user.

26. The system of claim 9 wherein generating HTML code comprises generating the HTML code in a form that that is configured to be interpreted by an accessibility application for an accessibility limited user.

27. The computer readable medium of claim 15 wherein generating HTML code comprises generating the HTML code in a form that that is configured to be interpreted by an accessibility application for an accessibility limited user.

28. The method of claim 1, wherein generating, by the browser, the HTML code further comprises:

determining the at least one menu item based on a context of the request for the menu content, wherein the context comprises at least one of an access right of the user and a menu item availability; and generating, by the browser, in the HTML code, a hyperlink associated to the determined at least one menu item.

29. The method of claim 1, wherein the second portion is JavaScript code and the first portion is SGML or XML code.

30. The computer readable medium of claim 14 wherein the menu content comprises at least one of JavaScript, SGML, or XML code.

31. The server of claim 22, wherein at least one item that is displayed within the displayed HTML version of the generated HTML code is after the HTML place holder in a tab order for browser navigation.

* * * * *

UNITED STATES PATENT AND TRADEMARK OFFICE
CERTIFICATE OF CORRECTION

PATENT NO. : 8,645,848 B2  Page 1 of 1
APPLICATION NO. : 11/145480
DATED : February 4, 2014
INVENTOR(S) : Lesh It is certified that error appears in the above-identified patent and that said Letters Patent is hereby corrected as shown below:

In the Claims

Column 7:
Line 56 (claim 3, line 3), change "applications" to -- application --.

Column 8:
Line 27 (claim 9, line 18), change "pace" to -- page --.
Line 28 (claim 9, line 19), change "pace" to -- page --.

Signed and Sealed this
Seventeenth Day of June, 2014

Michelle K. Lee
*Deputy Director of the United States Patent and Trademark Office*